US010330093B2

(12) United States Patent
Fan et al.

(10) Patent No.: US 10,330,093 B2
(45) Date of Patent: Jun. 25, 2019

(54) COMPRESSOR SYSTEM INCLUDING A PLURALITY OF COMPRESSORS

(71) Applicant: Danfoss (Tianjin) Ltd., Tianjin (CN)

(72) Inventors: Liang Fan, Tianjin (CN); David Genevois, Tianjin (CN); Shuguang Zhang, Tianjin (CN); Peng Liu, Tianjin (CN); Ying Dong, Tianjin (CN); Kongkham Lovan, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 219 days.

(21) Appl. No.: 15/209,165

(22) Filed: Jul. 13, 2016

(65) Prior Publication Data

US 2017/0016438 A1    Jan. 19, 2017

(30) Foreign Application Priority Data

Jul. 14, 2015    (CN) .................... 2015 2 0507515 U (51) Int. Cl.
| | |
|---|---|
| *F04B 23/04* | (2006.01) |
| *F04B 39/02* | (2006.01) |
| *F04B 39/12* | (2006.01) |
| *F04B 39/16* | (2006.01) |
| *F04B 41/06* | (2006.01) |
| *F25B 31/00* | (2006.01) |

(Continued)

(52) U.S. Cl.
CPC .......... *F04B 39/0207* (2013.01); *F04B 23/04* (2013.01); *F04B 39/023* (2013.01);
(Continued)

(58) Field of Classification Search
CPC ....................... F04B 39/0269; F04B 23/04–14; F04B 39/16; F04B 39/023–0292; F04B 39/0207; F04B 39/0284; F04B 49/20; F04B 53/20; F04B 53/18; F04B 53/16; F04B 41/06; F04B 39/12; F04B 39/121; F04B 39/123; B01D 19/00; B01D 19/0042; F25B 43/02;
(Continued)

(56) References Cited

U.S. PATENT DOCUMENTS

| | | | | |
|---|---|---|---|---|
| 4,729,228 A | * | 3/1988 | Johnsen | ............... F04B 39/0207 137/561 A |
| 8,312,732 B2 | * | 11/2012 | Sakitani | .................... F25B 9/06 418/84 |

(Continued)

FOREIGN PATENT DOCUMENTS

| | | |
|---|---|---|
| WO | 2014/022198 A1 | 2/2014 |
| WO | 2014/022289 A1 | 2/2014 |
| WO | 2014/022295 A1 | 2/2014 |

*Primary Examiner* — Bryan M Lettman
(74) *Attorney, Agent, or Firm* — McCormick, Paulding & Huber LLP (57) ABSTRACT

A compressor system includes: at least one variable-speed compressor, at least one fixed-speed compressor, a main suction pipe and a main discharge pipe; respective suction pipes of the variable-speed compressor and the fixed-speed compressor are connected to the main suction pipe in parallel, and respective discharge pipes of the variable-speed compressor and the fixed-speed compressor are connected to the main discharge pipe in parallel. The main suction pipe is configured with an oil-gas separation fitting structure, and the oil-gas separation fitting structure is designed to enable most oil of oil-gas mixture from the main suction pipe to move into the variable-speed compressor, and to make the variable-speed compressor stay in an oil-rich state.

19 Claims, 4 Drawing Sheets

(51) Int. Cl.
  *F25B 43/02*  (2006.01)
  *F04B 49/20*  (2006.01)
  *B01D 19/00*  (2006.01)

(52) U.S. Cl.
  CPC ...... *F04B 39/0269* (2013.01); *F04B 39/0284* (2013.01); *F04B 39/123* (2013.01); *F04B 39/16* (2013.01); *F04B 41/06* (2013.01); *F04B 49/20* (2013.01); *F25B 31/004* (2013.01); *F25B 43/02* (2013.01); *B01D 19/0042* (2013.01); *F25B 2400/0751* (2013.01)

(58) Field of Classification Search
  CPC ...... F25B 31/004; F25B 39/123; F25B 41/06; F25B 2400/0751; F04C 11/00–008; F04C 15/0088; F04C 15/0092; F04C 15/06; F04C 23/00–008; F04C 29/02; F04C 29/021; F04C 29/026; F04C 29/028; F04C 29/12
  See application file for complete search history.

(56) References Cited

U.S. PATENT DOCUMENTS

2013/0177404 A1\* 7/2013 Bernardi ................ F04D 29/00
                                                           415/168.1
2015/0044070 A1\* 2/2015 Zhang .................. F25B 31/002
                                                           417/228

\* cited by examiner

COMPRESSOR SYSTEM INCLUDING A PLURALITY OF COMPRESSORS

CROSS REFERENCE TO RELATED APPLICATION

Applicant hereby claims foreign priority benefits under U.S.C. § 119 from Chinese Patent Application No. 201520507515.0 filed on Jul. 14, 2015, the content of which is incorporated by reference herein.

TECHNICAL FIELD

The present invention relates to refrigeration and air-conditioning technologies, and in particular, to a system including a compressor.

BACKGROUND

Currently, a refrigeration and air-conditioning system may include a plurality of compressors, and the compressors form a compressor system. In the compressor system, oil amount in a specific compressor may be insufficient if respective oil amounts in the compressors are not in balance, thereby shortening life cycle of the specific compressor and affecting stability of the compressor system. To avoid this problem, some oil balancing method is generally adopted to enable the oil amount in each of the compressors in the compressor system to stay in an optimal state.

However, the conventional oil-balancing method cannot timely achieve oil balance between the compressors in the compressor system in real time, it is thus common that a compressor is severely starved of oil, and the compressor which is starved of the oil has to be stopped in order to realize oil returning. As a result, the compressors may be frequently started and stopped.

SUMMARY

The present invention provides a compressor system, including: at least one variable-speed compressor, at least one fixed-speed compressor, a main suction pipe and a main discharge pipe; where respective suction pipes of the variable-speed compressor and the fixed-speed compressor are connected to the main suction pipe in parallel, and respective discharge pipes of the variable-speed compressor and the fixed-speed compressor are connected to the main discharge pipe in parallel;

the main suction pipe is configured with an oil-gas separation fitting structure, and the oil-gas separation fitting structure includes:

a first opening connected with the main suction pipe, configured to introduce oil-gas mixture from the main suction pipe into the oil-gas separation fitting structure;

a second opening which can be in communication with the fixed-speed compressor, configured to introduce gas of the oil-gas mixture from the main suction pipe into the fixed-speed compressor; and a third opening which can be in communication the variable-speed compressor, configured to introduce most oil of the oil-gas mixture from the main suction pipe into the variable-speed compressor, and to make the variable-speed compressor stay in an oil-rich state.

In the compressor system according to an embodiment of the present invention, the second opening and the third opening may be perpendicular to each other.

In the compressor system according to an embodiment of the present invention, the second opening may be connected with a first pipeline extending to the fixed-speed compressor; and the third opening may be connected with a second pipeline extending to the variable-speed compressor.

In the compressor system according to an embodiment of the present invention, the first pipeline and the oil-gas separation fitting structure may be made as a one-piece part, and/or the second pipeline and the oil-gas separation fitting structure are made as a one-piece part.

In the compressor system according to an embodiment of the present invention, the first pipeline may be welded to the oil-gas separation fitting structure, and/or the second pipeline may be welded to the oil-gas separation fitting structure.

In the compressor system according to an embodiment of the present invention, the oil-gas separation fitting structure may include a main body, and an axial of the main body is in a horizontal direction; the first pipeline is configured to extend along a direction of the axial of the main body; the second pipeline is configured to extend along a downward direction perpendicular to the axial of the main body, and to introduce most of the oil in the oil-gas mixture from the main suction pipe into the variable-speed compressor along sidewall of the second pipeline due to gravity.

In the compressor system according to an embodiment of the present invention, the oil-gas separation fitting structure may include a main body, and an axial of the main body is in a horizontal direction; the first pipeline may be configured to extend along an upward direction perpendicular to the axial of the main body; the second pipeline may be configured to extend along a direction of the axial of the main body and to introduce most of the oil in the oil-gas mixture from the main suction pipe into the variable-speed compressor along with a gas flow direction.

In the compressor system according to an embodiment of the present invention, the oil-gas separation fitting structure may include a main body, and an axial of the main body is in a horizontal direction; the first pipeline may be configured to extend along a downward direction perpendicular to the axial of the main body; the second pipeline is configured to extend along a direction of the axial of the main body; the first pipeline may be configured with a wedge or nozzle structure at the second opening, and the wedge or nozzle structure has a shape for preventing oil entrance to the second opening so that most of the oil in the oil-gas mixture from the main suction pipe moves to the variable-speed compressor along with a gas flow direction.

In the compressor system according to an embodiment of the present invention, the wedge structure includes a first part and a second part; the first part is at an end where the first pipeline inserts into the oil-gas separation fitting structure and which is at upstream of a gas flow direction; the second part at the end where the first pipeline inserts into the oil-gas separation fitting structure and which is at downstream of the gas flow direction; a length of the first part inside the oil-gas separation fitting structure is larger than a length of the second part inside the oil-gas separation fitting structure.

The compressor system according to an embodiment of the present invention may further include an oil level switch; the oil level switch is configured at a position corresponding to a security oil level of an oil sump in the variable-speed compressor, and is configured to detect an oil level of the variable-speed compressor.

The compressor system according to an embodiment of the present invention may further include an oil-gas balancing pipe; an end of the oil-gas balancing pipe may be configured to connect to an oil sump of the variable-speed compressor, and the other end of the oil-gas balancing pipe may be configured to connect to an oil sump of the fixed-speed compressor; the oil-gas balancing pipe may be configured to reduce pressure difference between the variable-speed compressor and the fixed-speed compressor when the variable-speed compressor is working at a low frequency, to avoid too much oil transferred from the variable-speed compressor to the fixed-speed compressor via the oil-gas balancing pipe, and to implement oil and gas balance between the variable-speed compressor and the fixed-speed compressor.

In the compressor system according to an embodiment of the present invention, an axial of the oil-gas balancing pipe is at a position corresponding to respective standard oil levels of respective oil sumps in the variable-speed compressor and the fixed-speed compressor, and the oil-gas balancing pipe is full with gas at an upper part and is full with oil at a lower part in standard condition.

Alternatively, the compressor system according to an embodiment of the present invention may include an oil balancing pipe and a gas balancing pipe; an end of the oil balancing pipe may be connected to an oil sump of the variable-speed compressor, and the other end of the oil balancing pipe may be connected to an oil sump of the fixed-speed compressor; the oil balancing pipe is configured to balance respective oil levels of respective oil sumps in the variable-speed compressor and the fixed-speed compressor; an end of the gas balancing pipe may be connected to an upper part of the oil sump of the variable-speed compressor, and the other end of the gas balancing pipe may be connected to an upper part of the oil sump of the fixed-speed compressor; the gas balancing pipe may be configured to reduce pressure difference between the variable-speed compressor and the fixed-speed compressor when the variable-speed compressor is working at a low frequency, to avoid too much oil transferred from the variable-speed compressor to the fixed-speed compressor via the oil balancing pipe.

In the compressor system according to an embodiment of the present invention, the oil balancing pipe may be arranged below respective standard oil levels of the variable-speed compressor and the fixed-speed compressor, and the gas balancing pipe may be arranged above the respective standard oil levels.

The compressor system according to an embodiment of the present invention may include one variable-speed compressor and one fixed-speed compressor.

The compressor system according to embodiments of the present invention controls the amount of oil allocated to the fixed-speed compressor and the variable-speed compressor to make the variable-speed compressor stay in an oil-rich state, which can thus avoid oil shortage in any of compressors and thereby avoid damages to the compressor system caused by frequent start and stop of the oil level switch.

BRIEF DESCRIPTION OF THE DRAWINGS

The present invention will be described in the description with reference to the embodiments in combination with the accompanying drawings, where.

DETAILED DESCRIPTION

The following further describes the technical solutions of the present invention in detail with reference to the embodiments and in combination with the accompanying drawings. In the specification, same or similar reference signs indicate same or similar components. The following description to implementation manners of the present invention with reference to the accompanying drawings is intended to explain the embodiments of the present invention, and should not be construed as a limitation to the present invention.

Figure 1A:
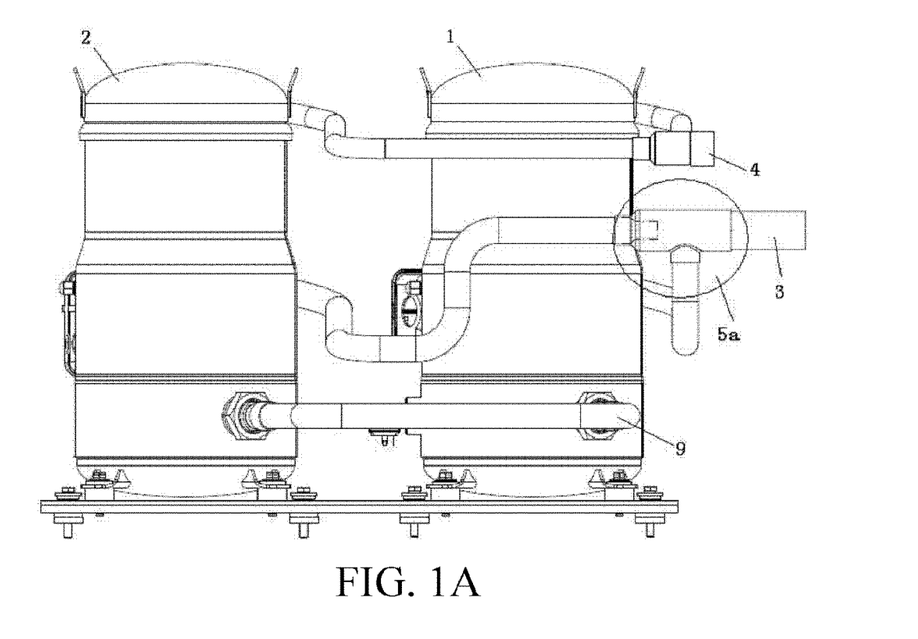
FIG. 1A is a perspective view of a compressor system according to a first embodiment of the present invention.

FIG. 1A is a perspective view of a compressor system according to a first embodiment according to the present invention. As shown in FIG. 1A, the compressor system includes a variable-speed compressor (VS) 1, a fixed-speed compressor (FS) 2, a main suction pipe 3, and a main discharge pipe 4; respective suction pipes of the variable-speed compressor 1 and the fixed-speed compressor 2 are connected to the main suction pipe 3 in parallel, and respective discharge pipes of the variable-speed compressor 1 and the fixed-speed compressor 2 are connected to the main discharge pipe 4 in parallel. Only one variable-speed compressor and one fixed-speed compressor are shown in the drawing, but the compressor system may include one variable-speed compressor and multiple fixed-speed compressors, or multiple variable-speed compressors and multiple fixed-speed compressors.

Figure 1B:
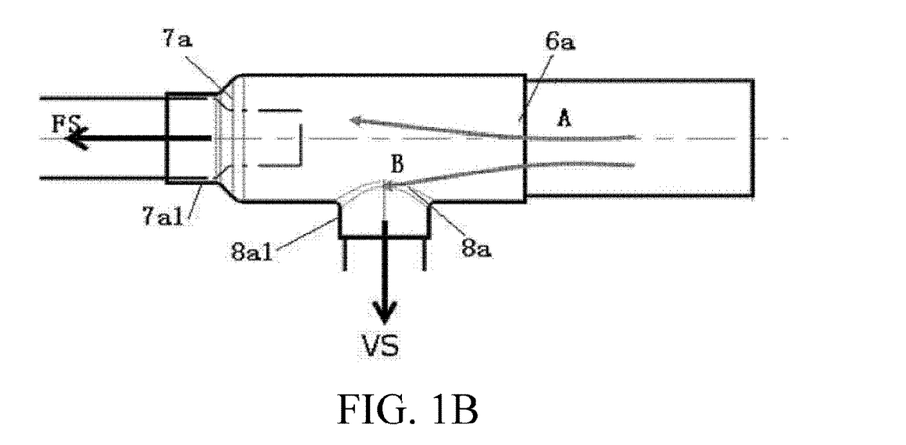
FIG. 1B is an enlarged view of an oil-gas separation fitting structure in the compressor system according to the first embodiment of the present invention.

In addition, as shown in FIG. 1A and FIG. 1B, the main suction pipe 3 is configured with an oil-gas separation fitting structure 5a. The oil-gas separation fitting structure 5a may include: a first opening 6a connected with the main suction pipe 3, configured to introduce oil-gas mixture from the main suction pipe 3 into the oil-gas separation fitting structure 5a; a second opening 7a which can be in communication with the fixed-speed compressor 2, configured to introduce gas of the oil-gas mixture from the main suction pipe 3 into the fixed-speed compressor 2; and a third opening 8a which can be in communication with the variable-speed compressor 1, configured to introduce most oil of the oil-gas mixture from the main suction pipe 3 into the variable-speed compressor 1, and to keep the variable-speed compressor 1 in an oil-rich state.

FIG. 1B is an enlarged view of an oil-gas separation fitting structure of the compressor system according to the first embodiment of the present invention. As shown in FIG. 1B, an axial of the second opening 7a may be perpendicular to an axial of the third opening 8a. The oil-gas separation fitting structure 5a may approximately be a tubular member, the tubular member may be configured with a tubular main body, and the main body is configured with an axial. As shown in FIG. 1B, the axial of the main body extends in a horizontal direction. In the oil-gas separation fitting structure 5a, the second opening 7a may be connected with a first pipeline 7a1 which can be in communication with the fixed-speed compressor 2; the third opening 8a is connected with a second pipeline 8a1 which can be in communication with the variable-speed compressor 1. The first pipeline 7a1 is configured to extend along a direction of the axial (that is, a horizontal direction shown in FIG. 1B) of the main body, the second pipeline 8a1 is configured to extend along a downward direction (that is, a vertical downward direction shown in FIG. 1B) perpendicular to the axial of the main body. Along a gas flow direction in the oil-gas separation fitting structure 5a, a gas flow passes through the third opening 8a and then flows to the second opening 7a. When the oil-gas mixture enters the oil-gas separation fitting structure 5a from the main suction pipe 3 via the first opening 6a, most of the oil in the oil-gas mixture is introduced into the variable-speed compressor 1 due to gravity, and a small part of the oil is introduced into the fixed-speed compressor 2 together with the gas flow. Consequently, most of the oil from the main suction pipe 3 is introduced into the variable-speed compressor 1, so as to keep the variable-speed compressor 1 in an oil-rich state.

In this embodiment, the first pipeline 7a1 and the oil-gas separation fitting structure 5a may be made as a one-piece part, and/or the second pipeline 8a1 and the oil-gas separation fitting structure 5a may be made as a one-piece part. Or the first pipeline 7a1 is welded to the oil-gas separation fitting structure 5a, and/or the second pipeline 8a1 is welded to the oil-gas separation fitting structure 5a.

In this embodiment, as shown in FIG. 1B, the third opening 8a is an opening formed in the tubular main body of the oil-gas separation fitting structure 5a, and the second pipeline 8a1 is inserted into the third opening 8a, but a depth of the insertion does not exceed a bottom of the tubular main body, i.e., does not exceed a thickness of the wall of the tubular main body.

The compressor system according to an embodiment of the present invention may further include an oil level switch (not shown). The oil level switch is configured at a position which is a security oil level of an oil sump of the variable-speed compressor 1, and is configured to detect an oil level of the variable-speed compressor 1. In addition to the oil-gas separation fitting structure, the oil level switch is used to monitor the oil level of the variable-speed compressor 1 so as to further ensure that the variable-speed compressor 1 always would stay in an oil-rich state.

According to an embodiment of the present invention, the compressor system may further include an oil-gas balancing pipe 9. As shown in FIG. 1A, one end of the oil-gas balancing pipe 9 is connected to an oil sump of the variable-speed compressor 1, and the other end of the oil-gas balancing pipe 9 is connected to the oil sump of the fixed-speed compressor 2. The oil-gas balancing pipe 9 is configured to balance the gas pressures and oil levels in respective oil sumps of the variable-speed compressor 1 and the fixed-speed compressor 2. In particular, when the variable-speed compressor 1 is working at a low frequency, high-pressure gas in the variable-speed compressor 1 is delivered to the fixed-speed compressor 2 via the oil-gas balancing pipe so as to avoid a too great pressure difference between the compressors which is caused by a too high pressure in the variable-speed compressor 2, thereby avoiding too much oil transferred from the variable-speed compressor 1 to the fixed-speed compressor 2 via the oil-gas balancing pipe 9 due to the great pressure difference.

According to an embodiment of the present invention, an axial of the oil-gas balancing pipe 9 is at a position which is a standard oil level of respective oil sumps of the variable-speed compressor 1 and the fixed-speed compressor 2. Under a standard working condition, the oil-gas balancing pipe 9 is full with gas at an upper part and is full with oil at a lower part. During operation of the compressor system, the pressure difference may be balanced through the upper part of the oil-gas balancing pipe 9, and the oil may be balanced by the lower part of the oil-gas balancing pipe 9. Therefore, oil balance in a system including the variable-speed compressor and the fixed-speed compressor may be implemented more effectively to keep the variable-speed compressor in an oil-rich state.

In another embodiment, the compressor system may include an oil balancing pipe and a gas balancing pipe (not shown). An end of the oil balancing pipe is connected to an oil sump of the variable-speed compressor 1, and the other end of the oil balancing pipe is connected to an oil sump of the fixed-speed compressor 2; the oil balancing pipe is configured to balance respective oil levels in respective oil sumps of the variable-speed compressor 2 and the fixed-speed compressor 1. An end of the gas balancing pipe is connected to an upper part of the oil sump of the variable-speed compressor 1, and the other end of the gas balancing pipe is connected to the upper part of the oil sump of the fixed-speed compressor 2. The gas balancing pipe is configured to reduce pressure difference between the variable-speed compressor and the fixed-speed compressor when the variable-speed compressor 1 is working at a low frequency, and thereby to avoid too much oil transferred from the variable-speed compressor 1 to the fixed-speed compressor 2 via the oil balancing pipe.

In an implementation manner, the oil balancing pipe is lower than the standard oil position of the variable-speed compressor 1 and the fixed-speed compressor 2, and the gas balancing pipe is above the standard oil position.

Figure 2A:
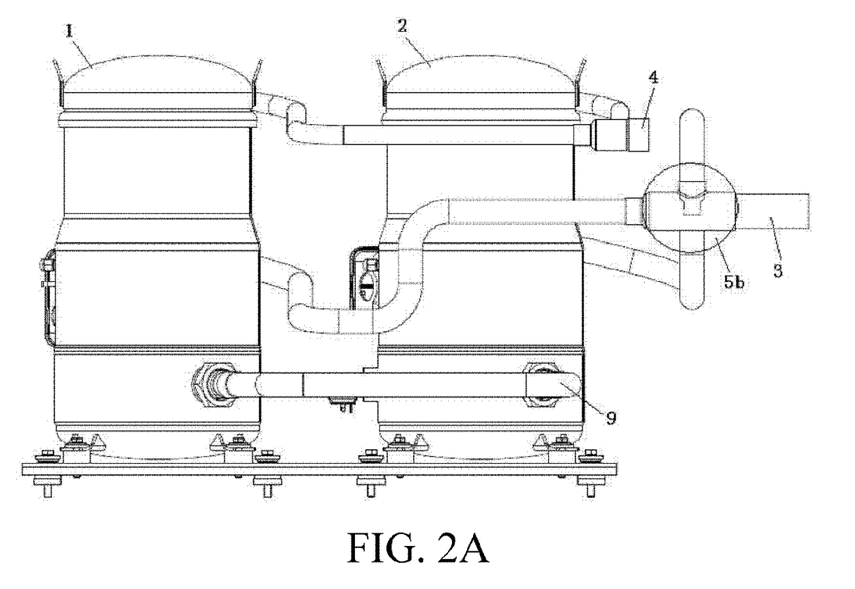
FIG. 2A is a perspective view of a compressor system according to a second embodiment of the present invention.
Figure 2B:
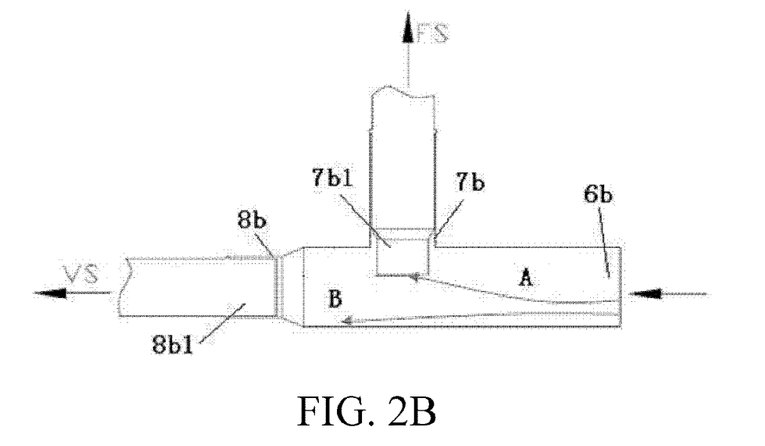
FIG. 2B is an enlarged view of an oil-gas separation fitting structure in the compressor system according to the second embodiment of the present invention.

FIG. 2A is a perspective view of a compressor system according to a second embodiment of the present invention, and FIG. 2B is an enlarged view of an oil-gas separation fitting structure of the compressor system according to the second embodiment of the present invention. In this embodiment, most components of the compressor system are the same as those in the first embodiment, and will not be described herein again. The following only illustrates the difference from the first embodiment.

As shown in FIG. 2A and FIG. 2B, an oil-gas separation fitting structure 5b may include: a first opening 6b connected with the main suction pipe 3, configured to introduce oil-gas mixture from the main suction pipe 3 into the oil-gas separation fitting structure 5b; a second opening 7b which can be in communication with the fixed-speed compressor 2, configured to introduce gas of the oil-gas mixture from the main suction pipe 3 into the fixed-speed compressor 2; and a third opening 8b which can be in communication the variable-speed compressor 1, configured to introduce most oil of the oil-gas mixture from the main suction pipe 3 into the variable-speed compressor 1, and to keep the variable-speed compressor 1 in an oil-rich state.

As shown in FIG. 2B, an axial of the second opening 7b may be perpendicular to an axial of the third opening 8b. The oil-gas separation fitting structure 5b may approximately be a tubular member, the tubular member may be configured with a tubular main body, and the main body has an axial. In the oil-gas separation fitting structure 5b, the second opening 7b is connected with a first pipeline 7b1 which can be in communication with the fixed-speed compressor 2; the third opening 8b is connected with a second pipeline 8b1 which can be in communication with the variable-speed compressor 1. As shown in FIG. 2B, the axial of the main body is in a horizontal direction, the first pipeline 7b1 is configured to extend along an upward direction perpendicular to the axial of the main body from the second opening 7b, and the second pipeline 8b1 may be configured to extend along the axial of the main body from the third opening 8b, thereby most of the oil in the main suction pipe 3 is introduced to the variable-speed compressor 1 along gas flow.

Figure 3A:
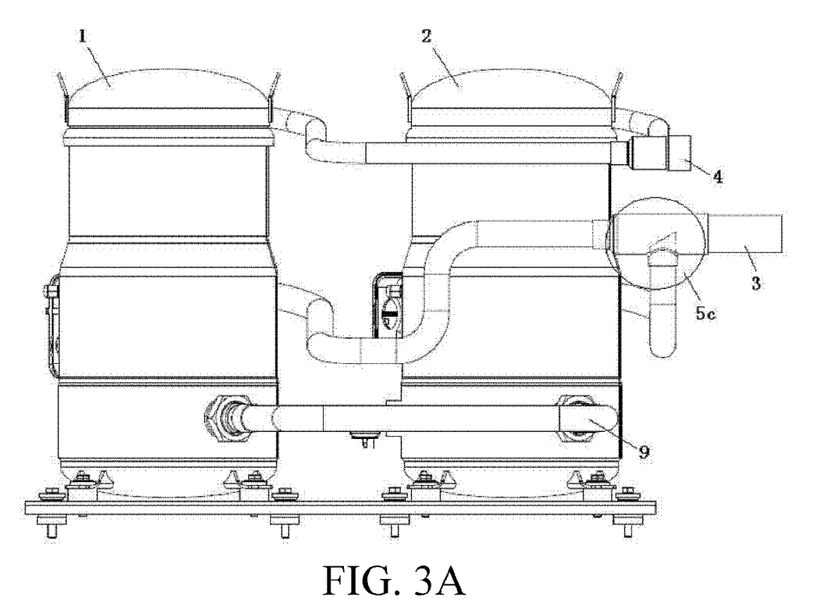
FIG. 3A is a perspective view of a compressor system according to a third embodiment of the present invention.
Figure 3B:
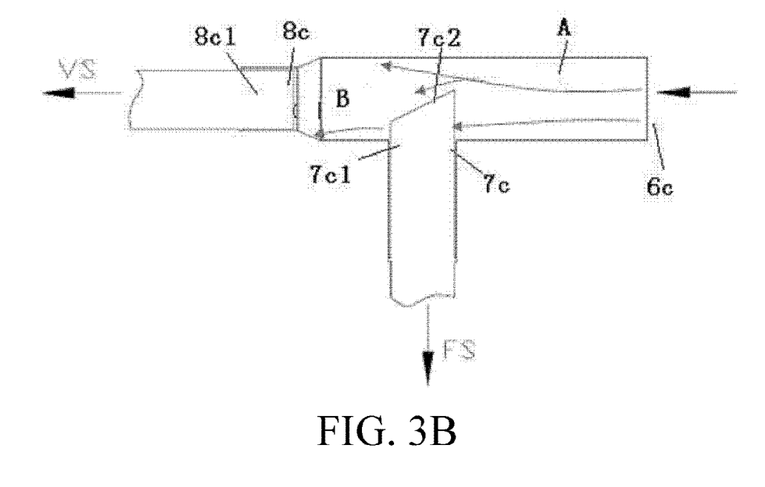
FIG. 3B is an enlarged view of an oil-gas separation fitting structure in the compressor system according to the third embodiment of the present invention.

FIG. 3A is a perspective view of a compressor system according to a third embodiment of the present invention, and FIG. 3B is an enlarged view of an oil-gas separation fitting structure of the compressor system according to the third embodiment of the present invention. In this embodiment, most components of the compressor system are the same as or similar to the first embodiment and the second embodiment, and will not described herein again. The following only illustrates the difference from the previous embodiments.

As shown in FIG. 3A and FIG. 3B, the oil-gas separation fitting structure 5c may approximately be a tubular member, the tubular member may be configured with a tubular main body, and the main body has an axial; and the oil-gas separation fitting structure 5c includes: a first opening 6c, connected with the main suction pipe 3; a second opening 7c which can be in communication with the fixed-speed compressor 2, configured to introduce the gas from the main suction pipe 3 to the fixed-speed compressor 2; and a third opening 8c which can be in communication with the variable-speed compressor 1, configured to introduce most of the oil from the main suction pipe 3 to the variable-speed compressor 1, and to keep the variable-speed compressor 1 in an oil-rich state.

As shown in FIG. 3B, an axial of the second opening 7c may be perpendicular to an axial of the third opening 8c. In an implementation manner, in the oil-gas separation fitting structure 5c, the second opening 7c is connected with a first pipeline 7c1 which can be in communication with the fixed-speed compressor 2; and the third opening 8c is connected with a second pipeline 8c1 which can be in communication with the variable-speed compressor 1. As shown in FIG. 3B, the axial of the main body extends in a horizontal direction. The first pipeline 7c1 is configured to extend along a downward direction perpendicular to the axial of the main body. The second pipeline 8c1 is configured to extend along a direction of the axial of the main body. The first pipeline 7c1 is configured with a wedge or nozzle structure 7c2 at the second opening 7c, and the wedge or nozzle structure 7c2 has a shape for preventing oil entrance to the second opening 7c, thereby most of the oil in the oil-gas mixture from the main suction pipe moving to the variable-speed compressor 1 along with a gas flow. Therefore, most of the oil from the main suction pipe 3 does not enter the first pipeline 7c1, but moves to the second pipeline 8c1 along with the gas flow, and then enters the variable-speed compressor 1. As shown in FIG. 3B, the wedge structure 7c2 includes a first part (a right part shown in FIG. 3B) at an end where the first pipeline 7c1 inserts into the oil-gas separation fitting structure 5c and which is at upstream of the gas flow, and also includes a second part at downstream of the gas flow (a left part shown in FIG. 3B), a depth of the first part inserted into the oil-gas separation fitting structure 5c is greater than a depth of the second part inserted into the oil-gas separation fitting structure 5c. Such a wedge structure can prevent most of oil in the oil-gas mixture from entering the first pipeline 7c1. The wedge structure may also be a nozzle structure that is specifically designed to prevent the oil from entering the first pipeline 7c1.

Figure 4A:
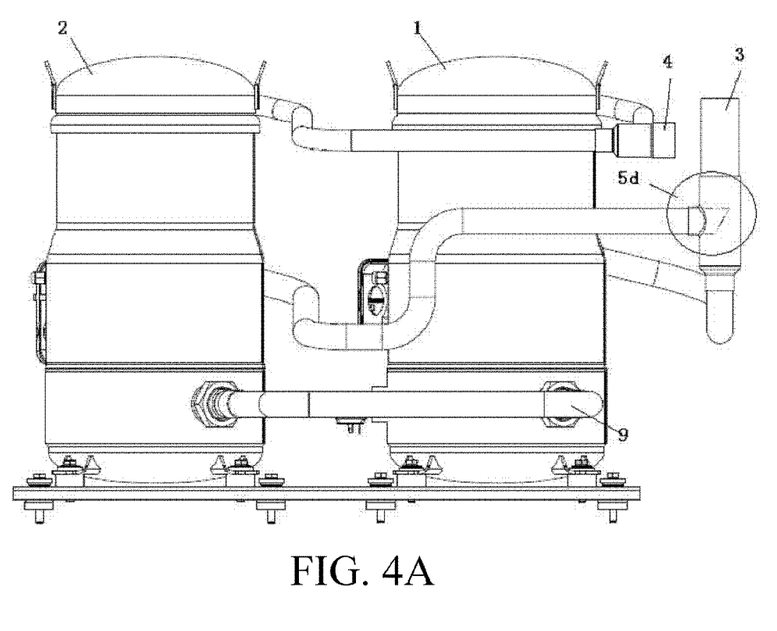
FIG. 4A is a perspective view of a compressor system according to a fourth embodiment of the present invention.
Figure 4B:
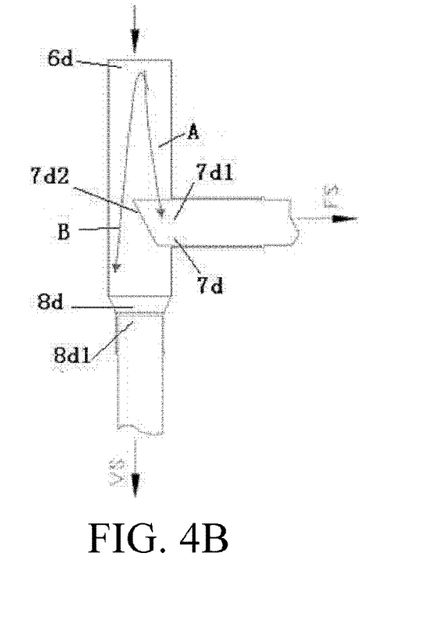
FIG. 4B is an enlarged view of an oil-gas separation fitting structure in the compressor system according to the fourth embodiment of the present invention.

FIG. 4A is a perspective view of a compressor system according to a fourth embodiment of the present invention, and FIG. 4B is an enlarged view of an oil-gas separation fitting structure of a compressor system according to the fourth embodiment of the present invention. In this embodiment, the main suction pipe 3 is vertically arranged, while a connection part between the first opening of the oil-gas separation fitting structure and the main suction pipe 3 is horizontally arranged in the foregoing the first, second and third embodiments. According to this embodiment, most components of the compressor system are the same as or similar to those in the first, second and third embodiments, and are not described herein again. The following will focus on the difference from the previous embodiments.

As shown in FIG. 4A and FIG. 4B, the oil-gas separation fitting structure 5d includes: a first opening 6d, connected with the main suction pipe 3; a second opening 7d which can be in communication with the fixed-speed compressor 2, configured to introduce the gas in the main suction pipe 3 into the fixed-speed compressor 2; and a third opening 8d which can be in communication with the variable-speed compressor 1, configured to introduce most of oil from the main suction pipe 3 into the variable-speed compressor 1, and to keep the variable-speed compressor 1 in an oil-rich state.

As shown in FIG. 4B, an axial of the second opening 7d is perpendicular to an axial of the third opening 8d. In the oil-gas separation fitting structure 5d, the second opening 7d is connected with a first pipeline 7d1 which can be in communication with the fixed-speed compressor 2; and the third opening 8b is connected with a second pipeline 8d1 which can be in communication with the variable-speed compressor 1. The oil-gas separation fitting structure 5d may include a main body, and an axial of the main body extends in a vertical direction. The first pipeline 7d1 is configured to extend along a direction perpendicular to the axial of the main body. The second pipeline 8d1 is configured to extend along a direction of the axial of the main body. The first pipeline 7d1 is configured with a wedge or nozzle structure at the second opening 7d, and the wedge or nozzle structure has a shape for preventing oil entrance to the second opening 7d. Thereby, most of the oil in the oil-gas mixture from the main suction pipe 3 moves to the variable-speed compressor along with a gas flow direction due to gas flow and gravity. Similarly, as shown in FIG. 4B, the wedge structure 7d2 includes a first part (an upper part shown in FIG. 4B) at an end where the first pipeline 7d1 inserts into the oil-gas separation fitting structure 5d and which is at upstream of the gas flow direction, and also includes a second part at downstream of the gas flow direction (a lower part shown in FIG. 4B). A depth of the first part inserted into the oil-gas separation fitting structure 5d is greater than a depth of the second part inserted into the oil-gas separation fitting structure 5d. Such a wedge structure can prevent most of oil in the oil-gas mixture from entering the first pipeline 7d1. The wedge structure may also be a nozzle structure that is specifically designed to prevent the oil from entering the first pipeline 7d1.

A operating process of the compressor system will be briefly described hereinafter according to the foregoing embodiments.

The oil-gas mixture from the main suction pipe is introduced into the oil-gas separation fitting structure via the first opening.

As described above, oil and gas in the oil-gas mixture are separated in the oil-gas separation fitting structure due to the gas flow and/or the gravity, or because of the wedge or nozzle structure in the oil-gas separation fitting structure.

The gas in the oil-gas mixture enters the first pipeline via the second opening, and is introduced into the fixed-speed compressor; and most of the oil in the oil-gas mixture enters the second pipeline via the third opening, and is introduced into the variable-speed compressor, so as to keep the variable-speed compressor in an oil-rich state. Because the variable-speed compressor can always stay in the oil-rich state, it can be ensured that the variable-speed compressor keeps in a normal working state, and it is thereby not necessary to frequently start and stop the variable-speed compressor. Consequently, a stable operation of the compressor system is ensured.

In addition, the oil-gas balancing pipe can reduce the pressure difference between the variable-speed compressor and the fixed-speed compressor when the variable-speed compressor is working at a low frequency, thereby avoiding too much oil transferred from the variable-speed compressor to the fixed-speed compressor via the oil-gas balancing pipe. Oil and gas balance between the variable-speed compressor and the fixed-speed compressor can thereby be realized, and the variable-speed compressor can be kept in the rich oil state.

Although the foregoing embodiments illustrate the present invention by using a compressor system including only one variable-speed compressor and one fixed-speed compressor as an example, it is obvious to persons skilled in the art that the foregoing embodiments can also be applied in a compressor system including multiple variable-speed compressors and multiple fixed-speed compressors.

The above are only some exemplary embodiments of the present invention, persons of ordinary skill in the art may understand that modifications may be made to these embodiments without departing from the principal and spirit of the general conception of the present invention, and the scope of the present invention is limited by claims and their equivalents.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A compressor system, comprising at least one variable-speed compressor, at least one fixed-speed compressor, a main suction pipe and a main discharge pipe;
   wherein respective suction pipes of the variable-speed compressor and the fixed-speed compressor are connected to the main suction pipe in parallel, and respective discharge pipes of the variable-speed compressor and the fixed-speed compressor are connected to the main discharge pipe in parallel;
   wherein the main suction pipe is configured with an oil-gas separation fitting structure, and the oil-gas separation fitting structure comprises:
   a first opening connected with the main suction pipe, configured to introduce oil-gas mixture from the main suction pipe into the oil-gas separation fitting structure;
   a second opening which is in communication with the fixed-speed compressor, configured to introduce gas of the oil-gas mixture from the main suction pipe into the fixed-speed compressor;
   a third opening which is only in communication with the variable-speed compressor, configured to introduce most of the oil of the oil-gas mixture from the main suction pipe only into the variable-speed compressor, and to make the variable-speed compressor stay in an oil-rich state; and
   the first opening, the second opening and the third opening are configured in such a way that the oil-gas mixture enters the first opening, passes the third opening and then flows to the second opening.

2. The compressor system of claim 1, wherein the second opening is configured to be connected with a first pipeline extending to the fixed-speed compressor;
   the third opening is configured to be connected with a second pipeline extending to the variable-speed compressor.

3. The compressor system of claim 2, wherein the first pipeline and the oil-gas separation fitting structure are made as a one-piece part, and/or the second pipeline and the oil-gas separation fitting structure are made as a one-piece part.

4. The compressor system of claim 2, wherein the first pipeline is configured to be welded to the oil-gas separation fitting structure, and/or the second pipeline is configured to be welded to the oil-gas separation fitting structure.

5. The compressor system of claim 2, wherein the oil-gas separation fitting structure comprises a main body, and an axis of the main body is in a horizontal direction;
   wherein the first pipeline is configured to extend along a direction of the axis of the main body; the second pipeline is configured to extend along a downward direction perpendicular to the axis of the main body, and to introduce most of the oil in the oil-gas mixture from the main suction pipe into the variable-speed compressor along sidewall of the second pipeline due to gravity.

6. The compressor system of claim 2, wherein the oil-gas separation fitting structure comprises a main body, and an axis of the main body is in a horizontal direction;
   wherein the first pipeline is configured to extend along an upward direction perpendicular to the axis of the main body; the second pipeline is configured to extend along a direction of the axis of the main body, and to introduce most of the oil in the oil-gas mixture from the main suction pipe into the variable-speed compressor along with a gas flow direction.

7. The compressor system of claim 2, wherein the oil-gas separation fitting structure comprises a main body, and an axis of the main body is in a horizontal direction;
   wherein the first pipeline is configured to extend along a downward direction perpendicular to the axis of the main body; the second pipeline is configured to extend along a direction of the axis of the main body;
   wherein the first pipeline is configured with a wedge or nozzle structure at an end of the first pipeline close to the second opening, and the wedge or nozzle structure has a shape for preventing oil entrance to the second opening so that most of the oil in the oil-gas mixture from the main suction pipe moves to the variable-speed compressor along with a gas flow direction.

8. The compressor system of claim 7, wherein the wedge structure comprises a first part and a second part;
   wherein the first part is at an end where the first pipeline inserts into the oil-gas separation fitting structure and which is at upstream of a gas flow direction;

wherein the second part at the end where the first pipeline inserts into the oil-gas separation fitting structure and which is at downstream of the gas flow direction;

wherein a length of the first part inside the oil-gas separation fitting structure is larger than a length of the second part inside the oil-gas separation fitting structure.

9. The compressor system of claim 2, wherein the oil-gas separation fitting structure comprises a main body, and an axis of the main body is in a vertical direction;

wherein the first pipeline is configured to extend along a direction perpendicular to the axis of the main body; the second pipeline is configured to extend along a direction of the axis of the main body;

wherein the first pipeline is configured with a wedge or nozzle structure at an end of the first pipeline closed to the second opening, and the wedge or nozzle structure has a shape for preventing oil entrance to the second opening so that most of the oil in the oil-gas mixture from the main suction pipe is introduced to the variable-speed compressor due to gas flow and gravity.

10. The compressor system of claim 9, wherein the wedge structure comprises a first part and a second part;

wherein the first part is at an end where the first pipeline inserts into the oil-gas separation fitting structure and which is upstream in a gas flow direction;

wherein the second part at the end where the first pipeline inserts into the oil-gas separation fitting structure and which is downstream in the gas flow direction;

wherein a length of the first part inside the oil-gas separation fitting structure is larger than a length of the second part inside the oil-gas separation fitting structure.

11. The compressor system of claim 2, wherein an axis of the second opening is perpendicular to an axis of the third opening.

12. The compressor system of claim 1, wherein an axis of the second opening is perpendicular to an axis of the third opening.

13. The compressor system of claim 12, further comprising an oil-gas balancing pipe;

wherein an end of the oil-gas balancing pipe is configured to connect to an oil sump of the variable-speed compressor, and an other end of the oil-gas balancing pipe is configured to connect to an oil sump of the fixed-speed compressor;

wherein the oil-gas balancing pipe is configured to reduce a pressure difference between the variable-speed compressor and the fixed-speed compressor when the variable-speed compressor is working at a low frequency, to avoid too much oil from being transferred from the variable-speed compressor to the fixed-speed compressor via the oil-gas balancing pipe, and to implement oil and gas balance between the variable-speed compressor and the fixed-speed compressor.

14. The compressor system of claim 12, further comprising an oil balancing pipe and a gas balancing pipe;

wherein an end of the oil balancing pipe is connected to an oil sump of the variable-speed compressor, and an other end of the oil balancing pipe is connected to an oil sump of the fixed-speed compressor; the oil balancing pipe is configured to balance respective oil levels of respective oil sumps in the variable-speed compressor and the fixed-speed compressor;

wherein an end of the gas balancing pipe is connected to an upper part of the oil sump in the variable-speed compressor, and an other end of the gas balancing pipe is connected to an upper part of the oil sump in the fixed-speed compressor; the gas balancing pipe is configured to reduce pressure difference between the variable-speed compressor and the fixed-speed compressor when the variable-speed compressor is working at a low frequency, to avoid too much oil transferred from the variable-speed compressor to the fixed-speed compressor via the oil balancing pipe.

15. The compressor system of claim 12, wherein there is one variable-speed compressor and one fixed-speed compressor.

16. The compressor system of claim 1, further comprising an oil-gas balancing pipe;

wherein an end of the oil-gas balancing pipe is configured to connect to an oil sump of the variable-speed compressor, and an other end of the oil-gas balancing pipe is configured to connect to an oil sump of the fixed-speed compressor;

wherein the oil-gas balancing pipe is configured to reduce a pressure difference between the variable-speed compressor and the fixed-speed compressor when the variable-speed compressor is working at a low frequency, to avoid too much oil from being transferred from the variable-speed compressor to the fixed-speed compressor via the oil-gas balancing pipe, and to implement oil and gas balance between the variable-speed compressor and the fixed-speed compressor.

17. The compressor system of claim 16, wherein an axis of the oil-gas balancing pipe is at a position that corresponds to respective standard oil levels of respective oil sumps in the variable-speed compressor and the fixed-speed compressor, wherein the oil-gas balancing pipe is full with gas at an upper part and is full with oil at a lower part.

18. The compressor system of claim 1, further comprising an oil balancing pipe and a gas balancing pipe;

wherein an end of the oil balancing pipe is connected to an oil sump of the variable-speed compressor, and an other end of the oil balancing pipe is connected to an oil sump of the fixed-speed compressor; the oil balancing pipe is configured to balance respective oil levels of respective oil sumps in the variable-speed compressor and the fixed-speed compressor;

wherein an end of the gas balancing pipe is connected to an upper part of the oil sump in the variable-speed compressor, and an other end of the gas balancing pipe is connected to an upper part of the oil sump in the fixed-speed compressor; the gas balancing pipe is configured to reduce pressure difference between the variable-speed compressor and the fixed-speed compressor when the variable-speed compressor is working at a low frequency, to avoid too much oil transferred from the variable-speed compressor to the fixed-speed compressor via the oil balancing pipe.

19. The compressor system of claim 18, wherein the oil balancing pipe is arranged below respective standard oil levels of the variable-speed compressor and the fixed-speed compressor, and the gas balancing pipe is arranged above the respective standard oil levels.

* * * * *